United States Patent [19]

Foster et al.

[11] Patent Number: 4,961,800

[45] Date of Patent: Oct. 9, 1990

[54] NON-DUSTING WINDOW ENVELOPE FILM UTILIZING A WAXY ANTI-FLECKING AGENT

[75] Inventors: Stephen I. Foster, Bexley; Jeffrey J. Stimler, Newark, both of Ohio

[73] Assignee: The Dow Chemical Company, Midland, Mich.

[21] Appl. No.: 220,289

[22] Filed: Jul. 18, 1988

[51] Int. Cl.$^5$ ............................................. B29C 51/02
[52] U.S. Cl. ................................. 156/108; 156/256; 156/498; 156/514; 264/509; 264/511; 264/564; 264/211; 264/300; 524/62
[58] Field of Search ............... 264/564, 563, 211, 213, 264/300, 511, 509; 524/910, 62; 156/108, 256, 498, 514

[56] References Cited

U.S. PATENT DOCUMENTS

| | | | |
|---|---|---|---|
| 2,408,690 | 10/1946 | Seymour | 264/300 |
| 2,540,146 | 2/1951 | Stober | 264/211 |
| 2,548,909 | 4/1951 | Ryden | 264/144 |
| 2,681,323 | 6/1954 | Groff et al. | 524/62 |
| 3,223,664 | 12/1965 | Conlon | 264/211 |
| 3,355,404 | 11/1967 | Ruffing et al. | 264/300 |
| 3,485,782 | 12/1969 | Nagle | 264/211 |
| 3,565,730 | 2/1971 | Weisshuhn | 425/388 |
| 3,629,387 | 12/1971 | Watanabe et al. | 264/564 |
| 3,709,753 | 1/1975 | Taylor | 156/108 |
| 3,864,295 | 2/1975 | Boussely | 264/300 |
| 3,873,645 | 3/1975 | Muirhead et al. | 524/910 |
| 3,887,414 | 6/1975 | Cohn | 156/498 |
| 4,061,706 | 12/1977 | Duffield et al. | 264/571 |
| 4,254,028 | 3/1981 | Ono et al. | 264/300 |

FOREIGN PATENT DOCUMENTS 50-97656 8/1975 Japan ......................... 264/211

*Primary Examiner*—Jeffery Thurlow
*Attorney, Agent, or Firm*—J. Robert Dean, Jr.

[57] ABSTRACT

Disclosed are window envelopes and a method of making wherein the window envelope film from which window patches are made contains an anti-flecking agent in the form of a wax.

8 Claims, No Drawings

NON-DUSTING WINDOW ENVELOPE FILM UTILIZING A WAXY ANTI-FLECKING AGENT

BACKGROUND OF THE INVENTION

This invention addresses the problem of film dust formation during the patching of polystyrene window envelope film. A window envelope is an envelope with one or more openings of any shape, usually rectangular, which allows examination of any information, typically a name and an address, printed on a limited area of matter within. The opening or openings are sealed or closed by a window patch composed of a non-opaque plastic film, usually polystyrene.

Patching is the process in which window envelope film is cut into patches of a desired length and width, gummed around the edges, and applied to the window envelope. Alternatively, the edges of the window opening or openings may be gummed instead of the edges of the window patch. The patching process requires the use of a vacuum drum to ensure proper positioning of the film. Film dust results from abrasion and scratching of the passing film by the surface of the vacuum drum due to the disparity in the speed of the passing film and the angular velocity of the drum. The abrasions and imperfections on the surface of the vacuum drum fleck away particles from the surface of the passing film resulting in film dust.

Film dusting was not a serious problem until recent advances in the operating speed of window envelope film patching units. Older units operated at about 400 envelopes per minute while modern units typically operate at about 800–1000 envelopes per minute. The increased scratching and abrasion of the passing film by the vacuum drum exacerbated the dusting phenomena to the point of being problematic.

The vacuum drum on a typical commercial patcher has a multiplity of minute vacuum holes and grooves on its surface to effect the adherence thereto and guidance thereon of the passing film or film patches. Vacuum holes are recessed in the grooves, which traverse the surface of the vacuum drum in both the machine and cross-machine directions relative to the passing window envelope film. The film dust accumulates in the vacuum holes and grooves and on the raised surfaces of the drum frustrating the adhering effects of the vacuum. Film dust also accumulates at a lesser rate in the internal areas of the vacuum drum and in the apparatus creating the vacuum. Process downtime is required to clean the vacuum drum and associated vacuum implementation equipment.

Window envelope films are typically composed primarily of extruded polystyrene, and, optionally, with a small proportion of a rubber-reinforced polymer to add a cosmetically desirable haze or measure of translucency to the film with the measure of translucency being proportional to the concentration. Window envelope film may be manufactured in both biaxial and uniaxial orientations. Biaxial orientation is generally preferred because of the superior cuttability of the film in the transverse or crossmachine direction.

SUMMARY OF THE INVENTION

According to the present invention, there is provided a window envelope having one or more window openings, the window opening being entirely closed by a non-opaque plastic window patch, the window patch being formed of a window envelope film having a composition which comprises: polystyrene and a dust-reducing quantity of an anti-flecking agent comprising a wax or combination of waxes of an acid, acid salt, ester, or amide derivative of an saturated aliphatics or alkylaromatics having a carbon chain length of about C10 to C35, an amide derivative of an unsaturated aliphatics and alkylaromatics having a carbon chain length of C10 to C35, or a polyolefin having a monomer carbon chain length of C2 to C3, and having a vapor pressure of less than 50 mm. Hg at 350° F. and a melting point of about 90–300° F.

There is also provided a process of preparing window envelopes, the improvement comprising forming the windows of such envelopes from a film incorporating an anti-flecking agent.

DETAILED DESCRIPTION

The present invention discloses a method of substantially reducing or practically eliminating film dusting in window envelope film or other similar polystyrene-based films with similar dusting problems. The method comprises the introduction of an antiflecking agent in the form of a wax or waxes to the predominantly polystyrene film composition. The mode of operation of the wax is not entirely clear, but it is believed to consist of a combination of two different actions. One mode is as a lubricant and the other is in the nature of a plasticizer or softener in that it makes the polystyrene film more deformable than it is without the anti-flecking agent. A lubricant in the film composition lowers the coefficient of friction of the film surface contacting the vacuum drum, resulting in reduced film dust formation. A practical limit to the addition of a lubricant to a film is that it must not be so lubricious as to cause adherence and guidance problems between the film and affected process surfaces; i.e., the vacuum drum surfaces.

The other mode of operation of the antiflecking agent and the most important for purposes of the present invention, is in the nature of a plasticizing or softening action. The plasticizing or softening action of the anti-flecking agent makes the film more deformable. Instead of flecking the film surface in contact with the vacuum drum, the imperfections and abrasions on the vacuum drum surface merely groove or plough it. Thus, the film is still scratched and abraded but not flecked. The resulting minutely scratched surface does not create any product aesthetic appearance problems.

A non-dusting window envelope film is, for the purpose of the present invention, defined as a polystyrene window envelope film with an amount of an anti-flecking agent added sufficient to reduce film dust formation on the surface of the vacuum drum of the patching unit of the type specified in the Comparitive Example to an extent that there is no trace visible to the unaided eye after a 4000 feet run of such film when conducted at substantially the same processing conditions as in the Comparitive Example. Subsequent references to a dust-reducing quantity of an antiflecking agent mean an amount or concentration of an anti-flecking agent in the window envelope film sufficient to effectuate the desired dust-reducing characteristic of above said non-dusting window envelope film.

A preferred composition of the non-dusting window envelope film of the present invention is polystyrene and from 0.1–5.0% by weight of one or more of the waxes as an anti-flecking agent, and, usually, an amount of a hazing agent sufficient to haze the film. The most preferred film composition is polystyrene, a hazing agent, and from 0.5 to 1.2% of a wax or waxes as an anti-flecking agent. Wax concentrations greater than 5% by weight in the film may result in undesirable whitening or discoloration of the film due to phase incompatibility between the polystyrene and the wax.

Suitable waxes include waxy acid, acid salt, ester, or amide derivatives of saturated aliphatics and alkylaromatics having a chain length of about C10 to C35, and amide derivatives of unsaturated aliphatics or aromatics having a carbon chain length of C10 to C35, and a polyolefin having a monomer carbon chain length of C2 to C3.

Examples of suitable waxy acid derivatives include behenic, arachidic, stearic, palmitic, and lauric. Examples of waxy acid salts include the sodium, magnesium, zinc and calcium salts of the aforementioned acids. Examples of waxy ester derivatives include the ethyl, propyl, or butyl esters of the fatty acids such as butyl stearate, ethyl stearate, butyl laurate, and isopropyl palmitate. Other examples of waxy ester derivatives include such derivatives of mineral waxes such as montanic acid triester and montanic acid di-ester. Examples of waxy amide derivatives include bis-stearamide, bis-lauramide, and stearamide. Examples of polyolefinic waxes include polyethylene and polypropylene. Molecular weights of suitable polyolefinic waxes include those in the 5000–10,000 range.

A suitable wax will have a vapor pressure of less than 50 mm. Hg at 350° F. and a melting point of about 90–300° F. Vapor pressures above this point may result in flashing of the wax at the lip of the extrusion die, and melting points above or below the indicated parameters may result in wax viscosities inconsistent with that of the polystyrene film.

Preferred anti-flecking agents are polyethylene waxes from 5000–10,000 MW and from 0.90–0.98 gm./cc density. The most preferred anti-flecking agent is polyethylene wax of the non-oxidized hydrocarbon type with a molecular weight from 8500–9500, a melting point of about 280–290° F., and a density from 0.95–0.97 gm./cc, which classifies it as high-density. Other suitable polyethylene waxes include halogenated or oxidized derivatives of the hydrocarbon species.

Other waxes suitable as hazing agents include the bis-amide of stearic acid and the tri- and diesters of montanic acid. Bis-stearamide wax is an offwhite amide wax commonly used as a lubricant for plastics. It has a molecular weight from 475–525, a density from 0.99–1.01 gm./cc., and a melting point from 280–288° F.

Montanic acid tri- and di-esters are waxy yellowish solids. These waxes have densities from 1.00–1.03 gm./cc., melting points from 172–182° F., and molecular weights from 900–1400.

The hazing agent is a substance, usually a rubber compound, added to the polystyrene to reduce film gloss and add a measure of haze or translucency to the film. This reduced gloss and introduced haze is desirable in window envelope film because the information shown under the film in the window envelope opening is more easily read with than without the haze, and any information outside the window opening is made more difficult to read. Examples of suitable hazing agents include homopolymers or copolymers of conjugated dienes, especially butadiene, and copolymer thereof, either block, random, or grafted, with up to about 40% of a comonomer such as styrene, EPDM rubbers, acrylate rubbers, chlorinated polyethylene, etc. The hazing agents may be added directly to the polymer melt employed to the prepare window film or compounded first with a polystyrene resin and then incorporated into the polymer melt. Desirably, the rubber particles should be of sufficient size to result in haze formation. Preferred are rubber particles of 0.5 to 5 micron number average particle size and more preferably 1.0 to 3.0 microns. Preferred film compositions contain from 0.1–1.0% rubber by weight as a hazing agent.

A most preferred rubber compound is the rubbery component of high-impact polystyrene (HIPS), especially such compositions of polybutadiene and polystyrene prepared by mass or solution polymerization containing about 5–10% by weight rubber. Polybutadiene or rubber particles of about 0.5–8.0 microns in diameter are interspersed in the polystyrene matrix of the highimpact polystyrene. A preferred film composition contains from 0.1 to 10.0% HIPS by weight as a hazing agent. A most preferred film composition contains from 5.0–10.0% HIPS by weight as a hazing agent.

The following examples are provided as further illustrative of the present invention and are not to be construed as limiting. Unless stated to the contrary, all parts and percentages are based on weight.

EXAMPLES

The test films were manufactured in a blown tubular extrusion process, though manufacture by other processes such as cast film extrusion may be used. The film constituents, polystyrene, high-impact polystyrene, and, in the case of the treated films, polyethylene wax or bis-stearamide wax, were blended at a temperature between 400–500° F. with the preferred blending temperature being 460° F. The operating temperature at the extrusion die is between 300–450° F. with the preferred temperature being 400° F.

COMPARATIVE EXAMPLE

The control test film comprised 10% HIPS and the balance polystyrene of about 300,000 molecular weight. The HIPS component in the cases of both the control films and the treated films comprised 7.0% rubber particles and 93% polystyrene, corresponding to about 0.7% rubber particles in the entire film. The rubber particles had an average diameter of about 3 micron number average particle size.

The control runs determined the extent of dust formation on the vacuum drum for a comparative polystyrene window envelope film lacking an anti-flecking agent. Five runs of film of 30 microns gauge, 4.5 in. width, 3.14 in. patch length, and 4000 feet in length were processed on the HSP Patcher for the F. L. Smithe RA 800 Series Envelope Machine. The HSP Patcher has 1/16" diameter holes recessed in grooves in both the machine and non-machine directions along the vacuum drum surface. The vacuum drum operated at 800 RPM and 7 in. Hg vacuum. After each run, ethylacetate, a solvent for polystyrene, was used to remove and collect the film dust from the surface of the vacuum roll. The solvent was then evaporated and the residue weighed. The average weight of flecked film deposited on the drum surface was 5.4 mg. While this amount may seem small, this was only about thirty-three minutes worth of production. Active commercial patching units must be cleaned as often as each week.

Examples 1-2

The tests involving the films treated with the polyethylene wax and the bis-stearamide wax were conducted on the same machine at substantially the same conditions and film dimension specifications as the control film. The film contained 1% polyethylene wax, 10% HIPS, and the balance polystyrene of about 300,000 molecular weight. The polyethylene wax was unoxidized with an average density of about 0.96 gm./cc. and an average molecular weight of about 9000. The bis-stearamide treated film contained 0.5% bis-stearamide wax, 10% HIPS, and the balance polystyrene of about 300,000 molecular weight. The bis-stearamide wax had a density of about 1.0 gm./cc. and a molecular weight of about 500.

The vacuum drum was visually inspected after each of two test runs for both the polyethylene wax and the bis-stearamide wax. Examination of the surface of the vacuum drum after the processing of the film treated with polyethylene wax on the patcher revealed no traces of film dust buildup. Examination of the surface of the vacuum drum after processing of the film with the bis-stearamide wax on the patcher revealed a slight but greatly reduced extent of film dusting. Visual inspection of the vacuum drum surface after runs of 4000 feet of film is an acceptable means of identifying dusting since trace amounts of dust are easily observable. Dusting of the order of 5.4 mg. as in the control tests is readily visible.

EXAMPLE 3

A test run of 45,000 feet of polystyrene window envelope film with a 10% HIPS concentration by weight and a 1% polyethylene wax concentration by weight was performed on the commercial patcher described above to compare with the 4000 feet run of the same film. Subsequent visual examination of the surface of the vacuum drum after the 45,000 feet run revealed no substantial degree of dusting.

Electron microscopy of the surface of the polyethylene-treated film and the untreated control film with only HIPS after processing on the patcher revealed the primary mode of operation, softening or lubrication of the test waxes, in preventing film dust formation. Comparison revealed an equivalent degree of scratching and abrasion even though the control film dusted and the film containing the polyethylene wax did not. Photomicrographs of the furrows of individual scratches on the film containing the polyethylene wax indicated a folding back of film material dislocated to the lip sides of the furrows of the scratch. Also, the bottoms of the furrows of individual scratches were generally smooth and unabraded. In contrast, photomicrographs of the furrows of the scratches in the untreated polystyrene control film with only a hazing agent indicated only a slight folding back of dislocated furrow film material on the lip sides of the furrows. Also, the bottoms of the furrows were scratched and abraded. The significance of only slight folding back of dislocated film material and abraded furrow surfaces is that most of the material affected by the surface abrasions was displaced instead of dislocated. The displaced film material is manifested in the form of film dust.

COMPARATIVE EXAMPLE 2

Lubrication of the film surface by the wax does play a role in reducing film dusting, but this role is secondary compared to the plasticization or softening of the film. A non-wax lubricant, propylene glycol, was compounded in a test film at 1% along with 10% HIPS and the balance polystyrene. Friction tests revealed static and kinetic coefficients of friction of 0.18 and 0.20, respectively. Friction tests for the same film with polyethylene wax substituted for the propylene glycol at the same weight percent revealed static and kinetic coefficients of friction of 0.29 and 0.30, respectively. However, an on-line run on the HSP Patcher of the film having propylene glycol added thereto indicated dusting to the same extent as a film with only HIPS and no anti-flecking or softening agent whatsoever. As indicated above, the film with the polyethylene wax did not dust to any perceptible degree when tested on the HSP Patcher. Therefore, a reduction in friction between the surface of the film and the surface of the vacuum drum is insufficient in itself to eliminate or substantially reduce the film dusting problem.

EXAMPLE 4

Film abrasion tests with a rubbing plate revealed additional waxes suitable as anti-flecking agents. Various film samples containing 1% of the candidate waxes were rubbed 30 times across the surface of a POLYOND nickel-polytetrafluoroethylene plate (of Polyplating, Inc.) in the machine direction of the film and examined for evidence of dusting on the plate surface. Additives shown to be suitable in reducing window envelope film dusting included oxidized polyethylene wax, montanic acid tri-ester wax, montanic acid di-ester wax, and bis-stearamide wax.

What is claimed is:

1. In a process for preparing and patching window envelope film, the improvement comprising: incorporating in a window envelope film composition before extrusion into a film a dust-reducing quantity of an anti-flecking agent or a combination of two or more such agents, the anti-flecking agent being a wax having a vapor pressure of less than 50 mm Hg at 350° F. and a melting point of about 90-300° F.

2. The method as recited in claim 1, wherein the wax is about 0.1-5.0% by weight of the window envelope film.

3. The method according to claim 2, wherein the wax is about 0.5-1.2% by weight of the window envelope film.

4. The method as recited to claim 1, wherein the wax is an oxidized polyethylene, a non-oxidized polyethylene, a bis-stearamide, a montanic acid triester, or a montanic acid di-ester.

5. The method according to claim 4, wherein the wax is non-oxidized polyethylene and has a density of about 0.90-0.98 gm./cc. and an average molecular weight of about 5000-10000.

6. The method according to claim 5, wherein the non-oxidized polyethylene has a density of about 0.95-0.97 gm./cc. and an average molecular weight of about 8500-9500.

7. The method as recited in claim 1, wherein the window envelope film has a hazing agent in an amount sufficient to provide a hazing effect.

8. In a process for preparing and patching window envelope film employing a vacuum drum, the improvement comprising: incorporating in a window envelope film composition before extrusion into a film a dust-reducing quantity of an anti-flecking agent or a combination of two or more such agents, the antiflecking agent being a wax having a vapor pressure of less than 50 mm Hg at 350° F. and a melting point of about 90-300° F.

* * * * *